United States Patent
Ganesan et al.

(10) Patent No.: US 11,341,150 B1
(45) Date of Patent: May 24, 2022

(54) ORGANIZING TIME-SERIES DATA FOR QUERY ACCELERATION AND STORAGE OPTIMIZATION

(71) Applicant: Clari Inc., Sunnyvale, CA (US)

(72) Inventors: Sriram Ganesan, Sunnyvale, CA (US); Brian Becker, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 0 days.

(21) Appl. No.: 17/325,561

(22) Filed: May 20, 2021

(51) Int. Cl.
| | |
|---|---|
| *G06F 16/2458* | (2019.01) |
| *G06F 16/2453* | (2019.01) |
| *G06F 16/21* | (2019.01) |
| *G06F 16/23* | (2019.01) |
| *G06F 16/2455* | (2019.01) |
| *G06F 16/22* | (2019.01) |

(52) U.S. Cl.
CPC ........ *G06F 16/2477* (2019.01); *G06F 16/213* (2019.01); *G06F 16/2282* (2019.01); *G06F 16/2358* (2019.01); *G06F 16/2453* (2019.01); *G06F 16/24552* (2019.01)

(58) Field of Classification Search
None
See application file for complete search history.

(56) References Cited

U.S. PATENT DOCUMENTS

| | | | | |
|---|---|---|---|---|
| 10,810,662 | B1 * | 10/2020 | Tanti | G06Q 40/02 |
| 10,997,137 | B1 * | 5/2021 | Goyal | G06F 16/248 |
| 2018/0246934 | A1 * | 8/2018 | Arye | G06F 16/2272 |
| 2019/0026329 | A1 * | 1/2019 | Gaumnitz | G06F 16/27 |
| 2020/0167355 | A1 * | 5/2020 | Rath | G06F 16/2457 |

* cited by examiner

*Primary Examiner* — Scott A. Waldron
(74) *Attorney, Agent, or Firm* — Womble Bond Dickinson (US) LLP

(57) ABSTRACT

The long-lived and recently modified (LLRM) partitioning is a system and method for partitioning slowly changing aged data for a given year into one long-lived partition (LLP) and multiple recently modified partitions (RMP) where the RMP corresponds to a time period of a first time granularity. Each record has a start and end time to indicate its lifetime. A record in a RMP is modified at a timepoint corresponding to the time period of a RMP. RMP records can be sampled every second, minute, hour or day. The LLP holds records whose lifetime is greater than the time period of a first time granularity. Queries pertaining to a given timepoint is performed on data that is a union of the LLP and the RMP pertaining to that timepoint instead of the unpartitioned table thus leading to shorter query processing time and better utilization of memory storage.

18 Claims, 15 Drawing Sheets

LLP 301

| VID | SID | Partition Week | Start Week | End Week | Start Day | End Day | Entity | Task Size | Task Stage |
|---|---|---|---|---|---|---|---|---|---|
| 1 | 1 | 0 | 1 | inf | 0 | 8 | A | 100,000 | 1 |
| 2 | 2 | 0 | 4 | inf | 0 | 8 | B | 100,000 | 2 |

305 — row 1
307 — row 2

RMP 4

| VID | SID | Partition Week | Start Week | End Week | Start Day | End Day | Entity | Task Size | Task Stage |
|---|---|---|---|---|---|---|---|---|---|
| 3 | 3 | 4 | 0 | 53 | 2 | inf | C | 100,000 | 1 |
| 4 | 4 | 4 | 0 | 53 | 2 | 3 | D | 100,000 | 1 |

309 — row 1
311 — row 2

System Time: Week 4, Day 3

Records prior to transactions:
- Entity A has record more than one week in LLP
- Entity B has record less than one week in LLP
- Entity C has one record in RMP
- Entity D has a complete (nonlive) record

FIG. 3

LLP 301

| VID | SID | Partition Week | Start Week | End Week | Start Day | End Day | Entity | Task Size | Task Stage |
|---|---|---|---|---|---|---|---|---|---|
| 1 | 1 | 0 | 1 | 4 | 0 | 8 | A | 100,000 | 1 |
| 2 | 2 | 0 | 4 | inf | 0 | 8 | B | 100,000 | 2 |

RMP 4

| VID | SID | Partition Week | Start Week | End Week | Start Day | End Day | Entity | Task Size | Task Stage |
|---|---|---|---|---|---|---|---|---|---|
| 3 | 3 | 4 | 0 | 53 | 2 | 3 | C | 100,000 | 2 |
| 4 | 4 | 4 | 0 | 53 | 2 | 3 | D | 100,000 | 1 |
| 1 | 1 | 4 | 0 | 53 | 1 | 3 | A | 100,000 | 1 |
| 5 | 1 | 4 | 0 | 53 | 3 | inf | A | 100,000 | 2 |
| 2 | 2 | 4 | 0 | 53 | 1 | 3 | B | 100,000 | 2 |
| 6 | 2 | 4 | 0 | 53 | 3 | inf | B | 100,000 | 3 |
| 7 | 3 | 4 | 0 | 53 | 3 | inf | C | 100,000 | 3 |
| 8 | 5 | 4 | 0 | 53 | 3 | inf | E | 100,000 | 1 |

System Time: Week 4, Day 3.

FIG. 4A

Updates to Entity A are performed by the following operations:
1. Record is endstamp'ed (E.g., end_week is updated to 4) in LLP.
2. Record is copied (VID is retained) to RMP with start_day as 1.
3. Record is endstamp'ed (E.g., end_day is updated to 3) in RMP.
4. New record inserted into RMP with start_day as 3 and end_day as inf.

Note that operations (2) and (3) in the above update to company A are not executed if the system time when the update is performed is a first day of the week. This avoids the scenario where both start_day and end_day for the copied record is marked as 1, since the database table is maintained to have invariant end_day > start_day and end_week > start_week.

Updates to Entity B are performed by the following operations:
1. Record is copied (VID is retained) to RMP with start_day as 1.
2. Record is deleted from LLP.
3. Record is endstamp'ed (end_day is marked as 3) in RMP.
4. New record inserted into RMP with start_day as 3 and end_day as inf.

Updates to Entity C are performed by the following operations:
1. Record in RMP is endstamp'ed (end_day is marked as 3).
2. New record inserted into RMP with start_day as 3 and end_day as inf.

Updates to Entity D:
-There are no updates to Company D but note that start_day < end_day is maintained.

Updates to Entity E:
-There are no existing records for Company E in LLP/RMP and a new record is inserted with start_day as 3 and end_day as inf.

FIG. 4B

| VID | SID | Partition Week | Start Week | End Week | Start Day | End Day | Entity | Task Amount | Task Stage |
|---|---|---|---|---|---|---|---|---|---|
| 1 | 1 | 0 | 1 | 4 | 0 | 8 | A | 100,000 | 1 |
| 5 | 1 | 0 | 5 | inf | 0 | 8 | A | 100,000 | 2 |
| 6 | 2 | 0 | 5 | inf | 0 | 8 | B | 100,000 | 3 |
| 7 | 3 | 0 | 5 | inf | 0 | 8 | C | 100,000 | 3 |
| 8 | 5 | 0 | 5 | inf | 0 | 8 | E | 100,000 | 1 |

305 — row VID 1
313 — row VID 5
315 — row VID 6
317 — row VID 7
319 — row VID 8

LLP 301

| VID | SID | Partition Week | Start Week | End Week | Start Day | End Day | Entity | Task Amount | Task Stage |
|---|---|---|---|---|---|---|---|---|---|
|  |  | 5 |  |  |  |  |  |  |  |

RMP 5

System Time: Week 5, Day 1

Transactions:
- Copy Week 4 records to LLP
- Create week 5 RMP

FIG. 5A

| VID | SID | Partition Week | Start Week | End Week | Start Day | End Day | Entity | Task Size | Task Stage |
|---|---|---|---|---|---|---|---|---|---|
| 1 | 1 | 0 | 1 | 4 | 0 | 8 | A | 100,000 | 1 |
| 5 | 1 | 0 | 5 | inf | 0 | 8 | A | 100,000 | 2 |
| 6 | 2 | 0 | 5 | inf | 0 | 8 | B | 100,000 | 3 |
| 7 | 3 | 0 | 5 | ~~inf~~ | 0 | 8 | C | 100,000 | 3 |
| 8 | 5 | 0 | 5 | ~~inf~~ | 0 | 8 | E | ~~100,000~~ | 4 |

LLP 301
RMP 5

| VID | SID | Partition Week | Start Week | End Week | Start Day | End Day | Entity | Task Size | Task Stage |
|---|---|---|---|---|---|---|---|---|---|
| 7 | 3 | 5 | 0 | 53 | 1 | 4 | C | 100,000 | 3 |
| 9 | 3 | 5 | 0 | 53 | 4 | inf | C | 100,000 | 4 |
| 8 | 5 | 5 | 0 | 53 | 1 | 4 | E | 100,000 | 1 |
| 10 | 5 | 5 | 0 | 53 | 4 | inf | E | 100,000 | 2 |

System Time: Week 5, Day 4

Transactions:
-Updates for companies C and E

FIG. 5B

Week 5, Day 1:
Records prior to transitions:
- Entity A has record more than one week in LLP and endstamp'ed on week 4.
- Entity A has another live record less than one week in LLP. Note that this has a start_week of 5.
- Entity B has one record less than one week in LLP.
- Entity C has one record less than one week in LLP.
- Entity E has one record less than one week in LLP.

There are four live records in LLP.

Week 5, Day 4:
Updates to Entity C results in the following flow:
1. Copy record to RMP by retaining the current vid, setting start_day as 1 and end_day as day of modification (in this case 4)
2. Insert a new record to RMP setting start_day as 4 and end_day as inf.

Updates to Entity E will result in a similar result as Company C.

There are 2 live records in LLP and 2 live records in RMP.

ORGANIZING TIME-SERIES DATA FOR QUERY ACCELERATION AND STORAGE OPTIMIZATION

FIELD OF THE INVENTION

Embodiments of the present invention relate generally to data processing by a data processing system. More particularly, embodiments of the invention relate to method and system for organizing time-series data for query acceleration and storage optimization.

BACKGROUND

Data analytics processes and data mining require analysis of large amounts of historical data. Data for these queries can be organized as fact and dimension tables in a time-series relational database. These tables allow analytical queries to retrieve data for a trend over period of time. For larger entities that have a lot of data, these tables can include tens of millions of records and queries, even with index optimizations, could take upwards of tens of minutes to execute. This renders the analytics functions unusable especially for the use case of an initial query where relational database tables have to be read from a storage disk into memory cache to process the queries. Slow queries lead to a poor user experience for an end user if the end user has to wait minutes before results are returned or in the worst case not having any results due to timeouts.

A conventional approach to store time series data in data warehousing is with a single table, using 8-byte longs to store start and end time range that each record is valid. Typically queries on this data are performed as of a certain time. For example, if a time point T is being queried and the database has attributes a start and an end time range as startStamp and endStamp, the queries for timepoint T will have the condition startStamp<=T and endStamp>T. Indexes on these tables are multicolumn indexes of the form (column, startStamp, endStamp). As the records accumulate over a period of time, the table and indexes get much bigger in size. Queries involving multiple time points would have to query a lot of underlying data to process the queries.

One approach to store data in a database is with unpartitioned data, e.g., as a single unpartitioned table. In this scenario, all records are queried to process a query request. If a majority of these records are on disk, caching these records into memory is time consuming, thus leading to poor query performance.

BRIEF DESCRIPTION OF THE DRAWINGS

Embodiments of the invention are illustrated by way of example and not limited to the figures of the accompanying drawings in which like references indicate similar elements.

FIG. 3 is a block diagram illustrating a long-lived partition (LLP) and a recently modified partition (RMP) according to one embodiment.

FIG. 4A is a block diagram illustrating a long-lived partition and a recently modified partition according to one embodiment.

FIG. 4B is a summary of transactions for FIG. 4A according to one embodiment.

FIG. 5A is a block diagram illustrating a long-lived partition and a recently modified partition at the start of a new week according to one embodiment.

FIG. 5B is a block diagram illustrating a long-lived partition and a recently modified partition according to one embodiment.

FIG. 5C is a summary of transactions for FIGS. 5A-5B according to one embodiment.

DETAILED DESCRIPTION

Figure 1A:
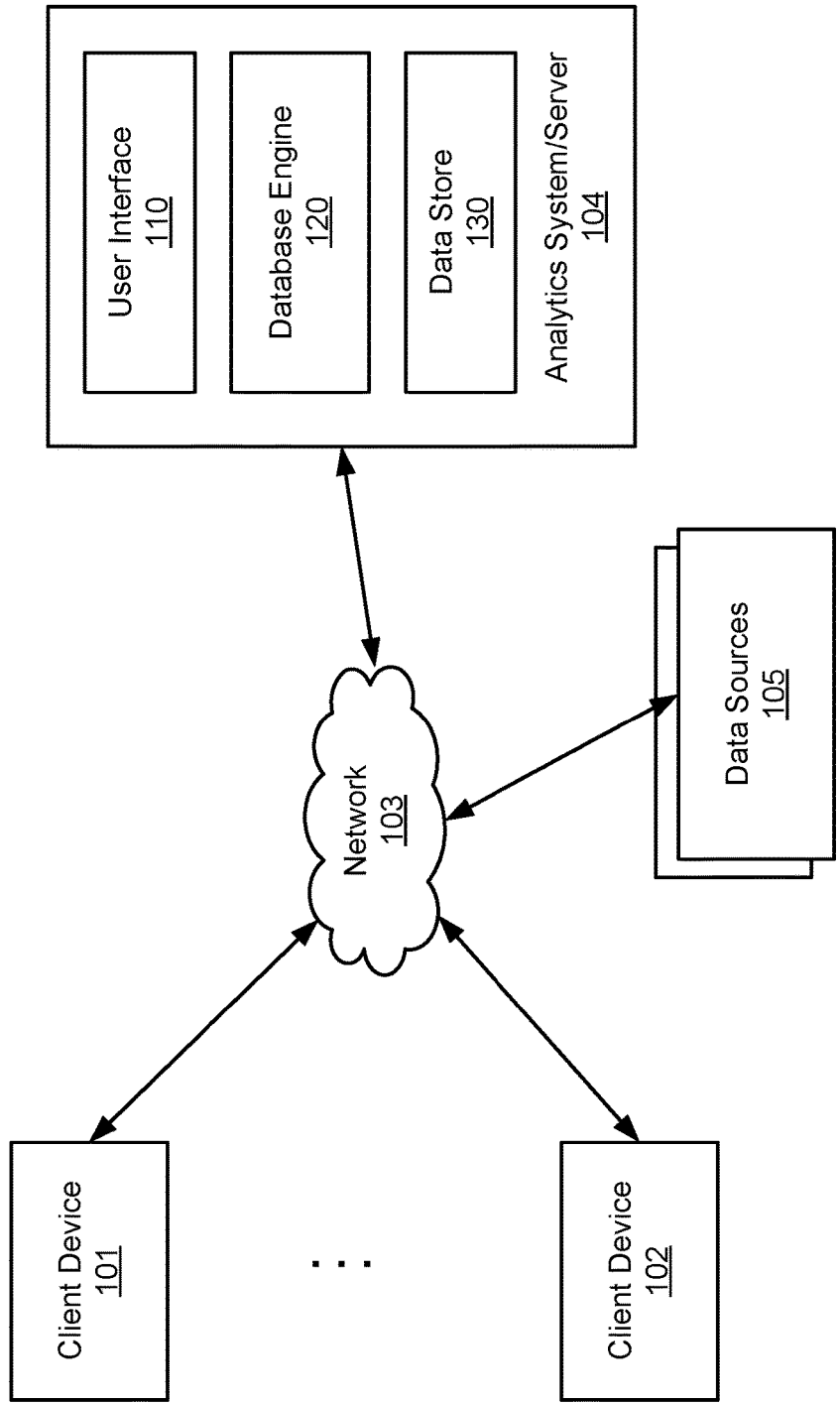
FIGS. 1A and 1B are block diagrams illustrating a network configuration according to certain embodiments.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to various embodiments, described herein are systems and methods directed to long-lived partitioning (LLP) and recently-modified partitioning (RMP) techniques for slowly changing data.

Aspects of the present disclosure addresses the above deficiencies by having a system with a long-lived partition (LLP) and one or more recently modified partitions (RMPs). A category of query (such as initial snapshot) to the system can combine (or for structured query language or SQL database, union) data from the LLP and a single most recently modified partition (RMP) rather than data from large unpartitioned table(s), or from several per-frequency partitioning tables. Advantages of the LLP and RMPs partitioning techniques in the present disclosure include a reduced query latency and a reduced storage cost.

According to a first aspect, a system receives a request to write a record to a database having a long lived partition (LLP) and one or more recently modified partitions (RMPs), where each of the one or more RMPs corresponds to a time period of a first time granularity. The system determines whether an existing record in a current RMP matches the record of the request. In response to determining that no record exists in the current RMP that matches the record of the request, the system determines whether an existing record in the LLP matches the record of the request. In response to determining that an existing record in the LLP matches the record of the request, the system determines whether a last modified time corresponding to the existing record has elapsed for a time period greater than the first time granularity. If the last modified time corresponding to the existing record has elapsed for a time period greater than the first time granularity, the system copies the existing record from the LLP to a current RMP. Otherwise, the system moves the existing record from the LLP to the current RMP. The system updates the copied or the moved record in the current RMP and inserts a new record in the current RMP based on the record of the request.

According to a second aspect, a system determines an index corresponding to a current recently modified partition (RMP), where the current RMP is stored in a database having a long lived partition (LLP) and one or more RMPs. The system performs a query for one or more records from the LLP and the current RMP based on an identifier of the LLP and the identifier of the current RMP using a single query statement.

FIG. 1A is a block diagram illustrating a network configuration according to one embodiment of the invention. Referring to FIG. 1A, system 100 includes, but is not limited to, one or more client systems 101-102 communicatively coupled to server 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Server 104 can be any kinds of servers or a cluster of servers, such as, for example, Web servers, application servers, cloud servers, backend servers, etc.

In one embodiment, server 104, which may be a cloud server, provides data analytics services to clients 101-102 based on task data provided by task database systems as a data source 105. Note that multiple task database systems may be implemented, where data analytics system 104 may be implemented as a multi-tenancy system that can access multiple task database systems concurrently. For example, a user of client device 101 may be associated with a first entity or organization as a first corporate client to data analytics system 104, while a user of client device 102 may be associated with a second entity or organization as a second corporate client to data analytics system 104. The first and second entities may employ different task database systems, each of which maintains a database or data structure storing a number of tasks completed or to be performed. Also note that a task database system is utilized as an example of data sources 105, however, other types of data sources or systems can also be used.

In one embodiment, data analytics system 104 includes, but it is not limited to, user interface 110, database engine 120 (also referred to as database manager, which may be part of database management software), and data store 130. User interface 110 can be any kind of user interface (e.g., Web, graphical user interface or GUI, or command line interface or CLI) that allows users of client devices 101-102 to access data analytics services provided by data analytics system 104, such as, for example, trend analysis, or pulse analysis services to be performed for various time periods. For example, via user interface 110, a user can request a trend snapshot/analysis for a set of tasks of a specific time period by specifying one or more attributes associated with the tasks. An attribute can be any person or user of an entity, a time period, a processing or workflow stage, a task stage representing a processing or progress stage of a particular task, a role of an entity, a geographic region, a task size indicating a task or project with a certain potential value (e.g., a deal with a certain deal size), or a particular person associated with a task (e.g., a person performing or managing a particular task or tasks), etc. Attributes can represent columns of a database table. For ease of illustration, Examples in FIGS. 3-6 illustrate attributes of time period, task stage, task value, and entity name.

In response to a request received via user interface 110 from a client, such as clients 101-102, database engine 120 determines a period of time (e.g., a query time period) based on the request that the user is interested in. The query time period can be a current quarter, week, day, or year. Database engine 120 further determines a set of one or more attributes, which may be received from a user via user interface 110. Database engine 120 retrieves task data associated with the time period and the one or more attributes from data store 130.

Data store 130 stores or caches a variety of slowly changing data, such as projects, tasks, and product facts, which may be periodically updated from corresponding data source(s) or data provider(s) 105, for example, via a periodically executed thread (which may be running on the background as a part of a housekeeping routine or thread) over a network (e.g., Internet). Alternatively, database engine 120 may dynamically access a task database system to query and retrieve task data using a variety of database accessing protocols associated with the task database system, such as an SQL protocol. Data stored in data store 130 can be maintained in a variety of data structures, such as one or more tables contained within one or more databases. Database engine 120 can access data store 130 via a variety of application programming interfaces (APIs), database queries, or other suitable communication protocols.

In one embodiment, database engine 120 performs data retrieval for one or more past time periods. Database engine 120 can retrieve data associated the determined past time periods from data store 130, where the retrieved data represents one or more facts. Database engine 120 can retrieve data for one or more time points for trend or pulse analysis.

Figure 1B:
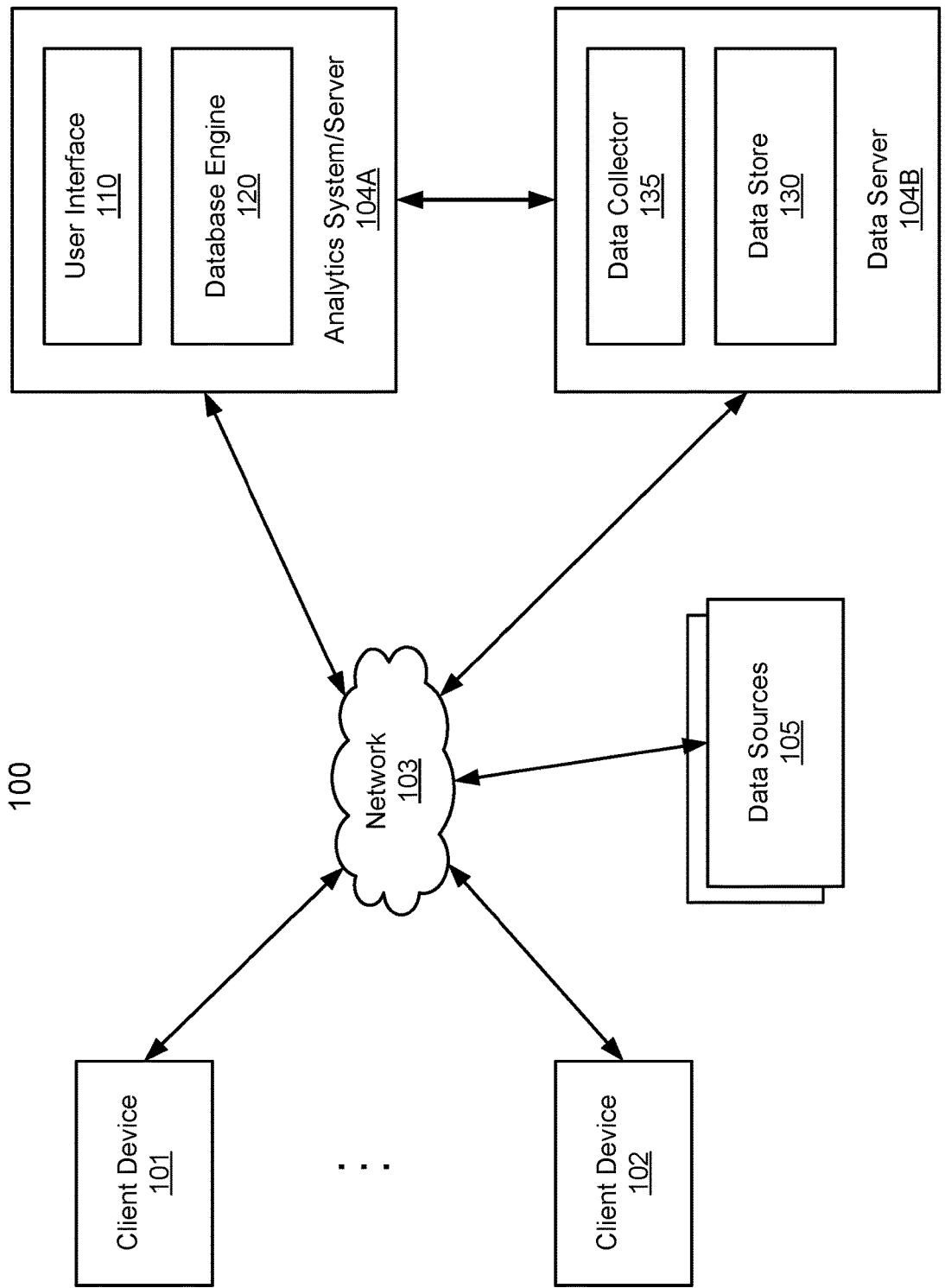

Although in this embodiment, data store 130 is maintained by data analytics system 104, however, data store 130 can be maintained in a dedicated data server that is a separate server from data analytics server 104 as shown in FIG. 1B. Referring now to FIG. 1B, in this embodiment, data analytics server 104A and data server 104B are implemented as separate servers. Data store 130 is now maintained by data server 104B. Data server 104B further includes data collector 135 configured to periodically or constantly collect or update task data from data sources 105. Data analytics server 104A communicates with data server 104B using a variety of communication protocols to access task data stored in data store 130.

Figure 2:
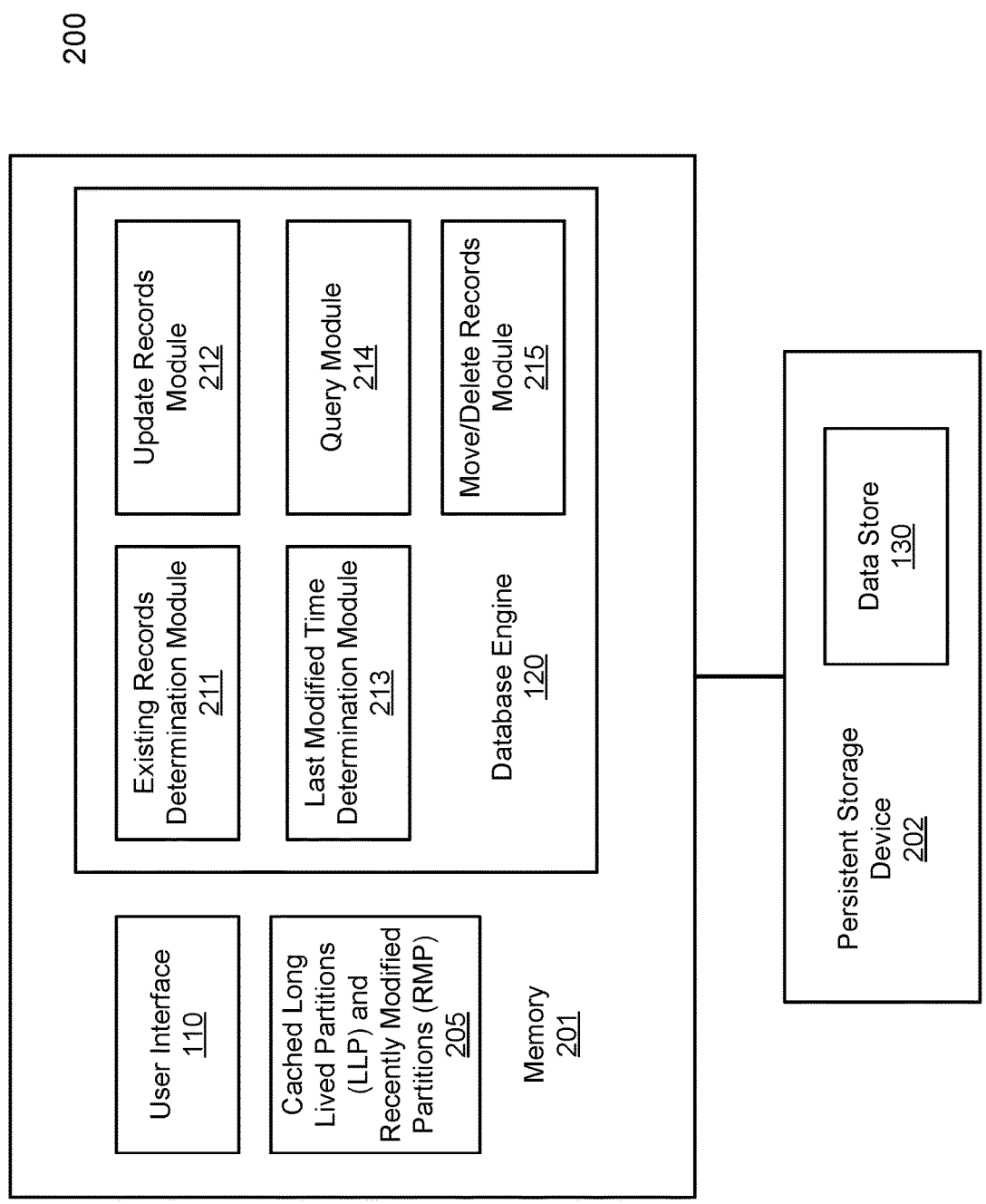
FIG. 2 is a block diagram illustrating an example of a long-lived recently modified (LLRM) data analytics system according to one embodiment.

FIG. 2 is a block diagram illustrating an example of a data analytics system according to one embodiment of the invention. System 200 may be implemented as part of data analytics system or server 104. Referring to FIG. 2, system 200 includes user interface 110 and database engine 120 loaded in memory 201 and executed by one or more processors (not shown). Data store 130 is stored in persistent storage device 202, such as a hard disk, which may be maintained locally or remotely over a network. At least a portion of task data stored in data store 130 may be cached in memory 201 as part of cached partitions 205 (e.g., long lived partitions and recently modified partitions). In one embodiment, database engine 120 includes, but is not limited to, existing records determination module 211, update records module 212, last modified time determination module 213, query module 214, and move/delete records module 215. Some or all of these modules may be implemented in software, hardware, or a combination thereof.

Existing records determination module 211 can determine if an existing record exists, in a LLP or a RMP of data store 130, that matches a record of a write request. The matching record in the LLP/RMP can refer to a record with one or more matching fields or matching attributes. A new record with existing matches can be identified with a same surrogate identifier, see FIG. 3. Update records module 212 can update an existing record in a LLP/RMP. Last modified time determination module 213 can determine a last modified time associated with a record. The last modified time can correspond to attributes start_week, end_week, start_day, and end_day, as further disclosed in FIGS. 3-6. Query module 214 can perform a query for records from a LLP/RMP, via attribute partition_week, as further disclosed in FIGS. 3-6. Move/delete records module 215 can move or delete records from a LLP/RMP. Some or all of modules 211-215 may be implemented in software, hardware, or a combination thereof. Some of modules 211-215 can be integrated modules. Some of modules 211-215 may be integrated together as an integrated module.

Long-lived and Recently Modified (LLRM) Partitioning Technique

The Long-lived and recently modified (LLRM) partitioning techniques rely on the fact that slowly changing data undergoes frequent modifications as long as the data is active (e.g., when the data is currently relevant, such as an ongoing task/project, etc.). In contrast, if data is inactive after a certain timepoint (e.g., when the data is no longer relevant, such as task completion, etc.), the data is rarely modified. Based on the nature of slowly changing data, a system can split the slowly changing data into a long-lived partition (LLP) that contains active records that have been unmodified for a certain period of time, and one or more RMPs. An RMP can include records that have just been modified within a period of time corresponding to the RMP. For example, if a granularity at which a system tracks the modified data is a week, the long-lived partition can contain data that has remained unmodified since a beginning of a week and recently modified partitions can contain data that has been modified within a particular week. The system can further include a granularity at which records start/end are tracked within the RMPs. This granularity could be per second, minute, hour or day. In one embodiment, only the latest modification within that granularity is retained.

FIGS. 3-6 are block diagrams illustrating a long-lived partition and a recently modified partition of slowly changing time-series data according to some embodiments. In one embodiment, each record in LLP and/or RMP can have the following data attributes:

SID (integer—4 bytes long): a "surrogate id" that uniquely identifies a time-series record (records in LLP/RMP with a same SID are considered to be the same time-series record). E.g., different versions of a time-series record share the same SID.

VID (bigint—8 bytes long): a "version id" that identifies a particular version of a record. The VID is a unique identifier identifying a record (a row) within LLP/RMP.

start_day (tinyint—1 byte long or smallint—2 byte long): the day of a week that the current version of a record was created (inclusive). In another embodiment, start_day (bigint—8 bytes long) is a time in seconds from the beginning of a week (e.g., 12:00 am Monday) that a record was created.

end_day (tinyint or smallint): the time that the current version of the record ceased to be active (exclusive). In another embodiment, end_day (bigint—8 bytes long): is a time in seconds from the beginning of a week (e.g., 12:00 am Monday) that the current version of the record ceases to be active. A version of the record ceases to be active when the record is modified and its end_day is updated, e.g., a task fact corresponding to the record is complete.

start_week (tinyint or smallint): the value of the week in which the record was started in the calendar year. This will hold the value 0 for recently modified partitions.

end_week (tinyint or smallint): the value of the week in which the record was endstamp'ed in the calendar year. This will hold the value 53 for recently modified partitions.

LLP/RMP can be indexed using compound indexes, which can be in the form of (column, begin, end). Examples could be (SID, start_week, end_week) or (SID, start_day, end_day) for the SID column. Other forms of compound indexes are possible.

In an embodiment, characteristics of an LLP can be defined as follows. Any record that was live in a calendar year (e.g., year 2020, 2021) and that was not created/modified for a certain period of time, for example, a week, are moved into LLP. Attributes start_week and end_week can represent the period of weeks during which the record was unmodified. Compound indexes with (column, start_week, end_week), where start_week and end_week being stored as tinyint/smallint. The reduced size of the data type combined with the scenario that the same record is not expected to appear frequently due to data modification patterns within the LLP, results in a smaller index size.

In an embodiment, characteristics of an RMP can be as follows. RMP partitions correspond to a predetermined period of time (e.g., a week), and has a granularity of, for example, a day or a second. Any record that was modified in a particular period of time would be inserted in the associated partition (e.g., week 1, week 2, . . . week 52). Attributes start_day and end_day, stored as tinyint or smallint, can represent the seconds or days since the start of the time period (start of week). If there are multiple modifications to a record within the granularity (a second or a day), only the most recent modification will be retained. Indexes on the table are compound indexes based on a rate of sampling. In another embodiment, if the number of partial indexes created is a small number, then indexes on the table can be simple indexes. For example, if the sampling rate is one per day and the granularity of the RMP partition is a week, then the number of per day partial indexes would be 7 which is a much smaller number compared to per second partial indexes if the sampling rate is one per second.

Querying

In one embodiment, LLP/RMP shares a same database schema. LLP/RMP can include the following attributes for queries of the time-series records. Attribute partition_week holds the week in which the data was modified for the recently modified partitions. For LLP, this attribute is set to a value of 0. This column can be used to facilitate partitioning. Attribute start_day is used by RMP, and holds the value of the second or the day relative to the start of the week in which the data was modified. This attribute is set to 0 in LLP. Attribute end_day is used by RMP, and holds the value of the second or the day relative to the start of week in which the record was endstamp'ed for recently modified partitions. This attribute is set to an end value in LLP. For example, this attribute is set to a value of 604801 if RMP has a granularity of a second. This attribute is set to a value of 8 if RMP has a granularity of a day. Attribute start_week is used by LLP, and holds the value of the week in which the record was started in the calendar year. This attribute is set to 0 for RMP. Attribute end_week is used by LLP, and holds the value of the week in which the record was endstamp'ed in the calendar year. This attribute is set to 53 for RMP.

Single time point query can be executed when an analytic system requires a snapshot at a single time point, or when data is initially loaded, to provide the user with an initial snapshot of tasks/facts. Examples of a single point query can be:

select a,b,c from llrm_oppfact
    where partition_week in (0, n) and start_week<=n and
        end_week>n
        and start_day<=x and end_day>x where a, b, c are query result columns, n is the week pertaining to which the query is being made, x is the number of seconds or days into the week, and llrm_oppfact represents the time-series tables of task/facts which can include a LLP and RMP.

Compared with unpartitioned data, in the single time point query, a system only needs to load LLP and RMP data into memory for query, which results in a reduced memory utilization compared with unpartitioned data.

Multiple time point query can be executed when a user performs a trend/multi-time point analyses, where data for two or more time points is required. Examples of a multiple point query can be:

With multiTimeCte(c1, c2) AS (VALUES (w1, t1), (w2, t2), (w3, t3) . . . );
select a,b,c from multiTimeCte multiTimeCte_alias
    CROSS JOIN LATERAL
    (select a,b,c from llrm_oppfact
        where    partition_week=0    or    partition_week=
            multiTimeCte_alias.c1 and
            start_week<=multiTimeCte_alias.c1         and
                end_week>
            multiTimeCte_alias.c1 and start_day<=
            multiTimeCte_alias.c2
            and end_day>multiTimeCte_alias.c2
    LEFT JOIN LATERAL
        select a,b,c from llrm_oppfact
            where mod_week in (0, n) and start_week<=n and
                end_week>n and start_day<=x and end_day>x)

Attribute multiTimeCte_alias refers to an alias of a common table expression (CTE) multiTimeCte, which is a temporary named result set that can be referenced within another query statement. c1 refers to the week pertaining to which the query is being made for a first timepoint, c2 refers to seconds/day pertaining to which the query is being made for the first timepoint, (a, b, c) are query result columns, n is the week pertaining to which the query is being made for a second timepoint, x is the number of seconds or days into the week for the second timepoint, and llrm_oppfact represents the time-series tables of task/facts which can include a LLP and RMP.

Indexing

A database index is a data structure that improves the speed of data retrieval operations on a database table at the cost of additional writes and storage space to maintain the index data structure. Indexes for the LLP or the RMPs can be simple indexes or compound indexes. In one embodiment, indexes for the LLP can be in compound of the form (column, start_week, end_week) where start_week and end_week can be tinyint or smallint.

In one embodiment, indexes for the RMPs can be compound of the form (column, start_day, end_day), where start_day and end_day could be integer or smallint depending on the granularity of RMPs.

Write Transaction Implementations

Data store 130 of FIG. 1 can store time-series data from various data sources 105, such as third-party database systems. In one embodiment, database engine 120 dynamically accesses third-party database systems to retrieve time-series data and write the retrieved time-series data into data store 130. In some embodiments, the time-series data is a data point manually inserted by a user/operator. Although the content of the time-series record can be updatable, some table columns (e.g., VID, SID, partition_week, start_week, end_week, start_day, end_day) can be updated automatically by database engine 120 to follow a particular rule when a record is written into data store 130. Example scenarios of write transactions for LLP/RMPs can be illustrated by FIGS. 3-4B.

FIGS. 3-4B illustrate LLP 301 and RMP 4 of time-series data for tasks/facts, where LLP 301 has records with a granularity of a week, and RMP 4, spans data for a week, and has records with a granularity of a day according to one embodiment. The LLP/RMP data are associated with a system time, which can be a local time on server 104 of FIG. 1, or a remote time that is synced to a reference clock from a network source. In one embodiment, LLP and RMPs have a same schema. Although only one RMP (for week 4) is shown in FIGS. 3-4B, for ease of illustration, data store 130 can include multiple RMPs that are not shown (e.g., week 1, week 2, week 3).

Referring to FIG. 3, in this example, initially there are one record for each of entity A (305) and entity B (307) in LLP 301, and one record for each of entity C (309) and company D (311) in RMP 4, where a current system time may be week 4, day 3 of year 2021. In this example, the record for entity A is alive (e.g., end week is inf) and unmodified for more than a week (a first time granularity) because the start week has a value of 1. The record for entity B is alive (e.g., end week is inf) and may be unmodified for less than a week, because the start week has a value of 4. The record for entity C is alive (e.g., end day is inf) with a start day of 2. The record for entity D is no longer live, e.g., the task for entity D had just been completed or been abandoned, because entity D has an end day of 3. In one embodiment, the record that was modified in the previous week should have stayed unmodified for an entire week to qualify for long-lived status. Records that qualify for long-lived status are retained in the LLP.

In some embodiments, LLRM can receive a write request to write a record (identified with entity, task size, and/or task stage) into data store 130, where there may be existing records in the LLP or RMP. A record in LLP/RMP may exist if there is a match in one or more immutable naturally identifying attributes, such as an identifier field. For example, if an analytics system identifies projects by entity, then a record match exists if a write transaction has a matching entity name. Although only three attributes are shown in FIGS. 3-5 and matching is performed for the entity name attribute, LLP and RMP can have any number of attributes for other time-series analytics, e.g., products, tasks, projects, financial data, etc. and attributes matching may be performed for any number of attributes.

In one embodiment, if a record exists in LLP and if the record is unmodified for a time period greater than a first time granularity (e.g., a week), a write transaction can include copying the existing record from the LLP to the RMP, and updating the fields in the copied record according to the write request. This scenario is shown for the record related to a change in task stage for entity A, as illustrated in FIGS. 3-4, where FIG. 3 is before, and FIG. 4 is after, a write transaction, where a current system time is week 4, day 3. Here, rows 312-313 are record splits that are copied (e.g., simply copied) and inserted corresponding to row 305, where end week in row 305 is updated to a value of a current week (value 4). Fields (partition week, start day, end day) of row 312 are updated to (4, 1, 3), where 4 represents a current week, 1 represents a start of the current week, and 3 represents a current day, while retaining the same VID as that in the LLP. SID remains the same (value of 1) since it refers to the same time-series record as row 305. Fields (partition week, start day, end day) of row 313 are updated to (4, 3, inf), where 4 represents a current week, 3 represents a current day, and inf indicates the record is alive. A VID value of 5 is assigned to row 313 to uniquely identify row 313. SID remains the same (value of 1) since it refers to the same time-series record as row 305. (start_week, end_week) for rows 312-313 are set to (0, 53), and the record attributes are updated according to the write request, (e.g., task stage is updated from a value of 1 to a value of 2).

In one embodiment, if a record exists in LLP and if the record is unmodified for less than the period of a first time granularity (a week), a write transaction can include copying the existing record from the LLP to the RMP, and updating the fields in the copied update according to the write request. This scenario is shown for the record related to a change in task stage for entity B. As illustrated in FIGS. 3-4, rows 314-315 are record splits that are copied (e.g., simply copied) and inserted corresponding to row 307, where row 307 is deleted after the copy operations. The copy operation can be an insert SQL statement. The copy and delete operations can be representative of a move operation, which can be insert and delete SQL statements. Fields (partition week, start day, end day) of row 314 are updated to (4, 1, 3), where 4 represents a current week, 1 represents a start day of the current week, and 3 indicates the current day, and row 314 retains the same VID of 2 as row 307. Fields (partition week, start day, end day) of row 315 are updated to (4, 3, inf), where 4 represents a current week, 3 represents a current day, and inf indicates the record is alive. A new VID value of 6 is assigned to row 315 to uniquely identify row 315. SID remains the same (value of 2) since it refers to the same time-series record as row 307. (start_week, end_week) are rows 314-315 are set to (0, 53), and the record attributes are updated according to the write request, (e.g., task stage is updated from a value of 2 to a value of 3). Note that the data point in row 307 is not lost because a copy of the data (rows 314-315) exists in RMP of week 4.

In one embodiment, if a record exists in RMP 4, a write transaction can include copying the existing record from RMP 4 to a new row in RMP 4, and updating the fields in the copied record according to the write request. This scenario is shown for the record related to a change in task stage for entity C. As illustrated in FIGS. 3-4, row 309 is copied (e.g., simply copied) to row 317. End_day for row 309 is updated to 3 corresponding to the current system time of week 4, day 3. Fields (partition week, start day, end day) of row 317 are updated to (4, 3, inf), where 4 represents a current week, 3 represents a current day, and inf indicates the record is alive. VID of row 317 is assigned a value of 7 to uniquely identify row 317. SID remains the same (value of 3) since it refers to the same time-series record as row 309. Note that the data in rows 309, 317 captures entity C having its task stage being transitioned from 2 to 3.

In one embodiment, if a record does not exist in LLP/RMP. The record is inserted to RMP 4. This scenario is shown for the record related to a new task for entity E. As illustrated in FIGS. 3-4, row 319 is inserted. Fields (partition week, start day, end day) of row 319 are set to (4, 3, inf), where 4 represents a current week, 3 represents a current day, and inf indicates the record is alive. SID is set to a value of 5. Since there are no other records with SID=5, no other records are related to entity E. VID of row 319 is assigned a value of 8 to uniquely identify row 319. (start_week, end_week) are set to (0, 53), and other record attributes are updated according to a write request (e.g., entity=E, task amount=100,000, task stage=1).

FIG. 5A illustrates the scenario to seed a new week. This scenario occurs at the end of week 4, or beginning of week 5, e.g., a system time being year 2021, week 5, day 1, 12:00:00 am. In one embodiment, for a snapshot at the beginning of week 5, database engine 120 creates a new RMP partition for week 5, and copies live records from RMP 4 to LLP 301, as shown in FIG. 5A. Here, records 313, 315-319 in RMP 4 are live records, since these records have an end day of inf. These records are copied to LLP 301 as shown in the snapshot LLP 301 in FIG. 5A. The records moved to LLP 301 are assigned a start week equals to 5. The records in RMP 4 that are not live are not copied to LLP 301. E.g., a task for entity D (row 311) is abandoned or completed because it has an end day of 3, so it is no longer live and it is not copied to LLP. Rows 309, 312, 314 shared the same SIDs with rows 317, 313, 315, respectively and are records of the same time-series. Rows 309, 312, 314 can be considered to be collapsed into rows 317, 313, 315, e.g., only rows 317, 313, 315 are copied to LLP. Thus, rows 313, 315-319 are copied from RMP 4 to LLP 301, where their fields (start_day, end_day) are assigned (0, 8). Note that LLP 301 retains data with a granularity of a week, so changes within a week is collapsed into one row.

FIG. 5B illustrates a snapshot where records in LLP (that are less than a week) are updated. In this scenario, entity C and entity E have task stages being updated, from the snapshot of FIG. 5A to the resulting snapshot of FIG. 5B. For example, considering the system time to be week 5, day 4, in FIG. 5B, record 321-323 are split copies of record 317 for entity C and record 325-327 are split copies of record 319 for entity E (transactions for entities C and E are similar to that for entity B (record 307) of FIG. 4A). Records 321 retains the VID 7 of record 317 and records 325 retains the VID 8 of record 319. The corresponding task stages are updated (3 to 4, 1 to 2). Records 317 and 319 are then deleted.

Figure 6:
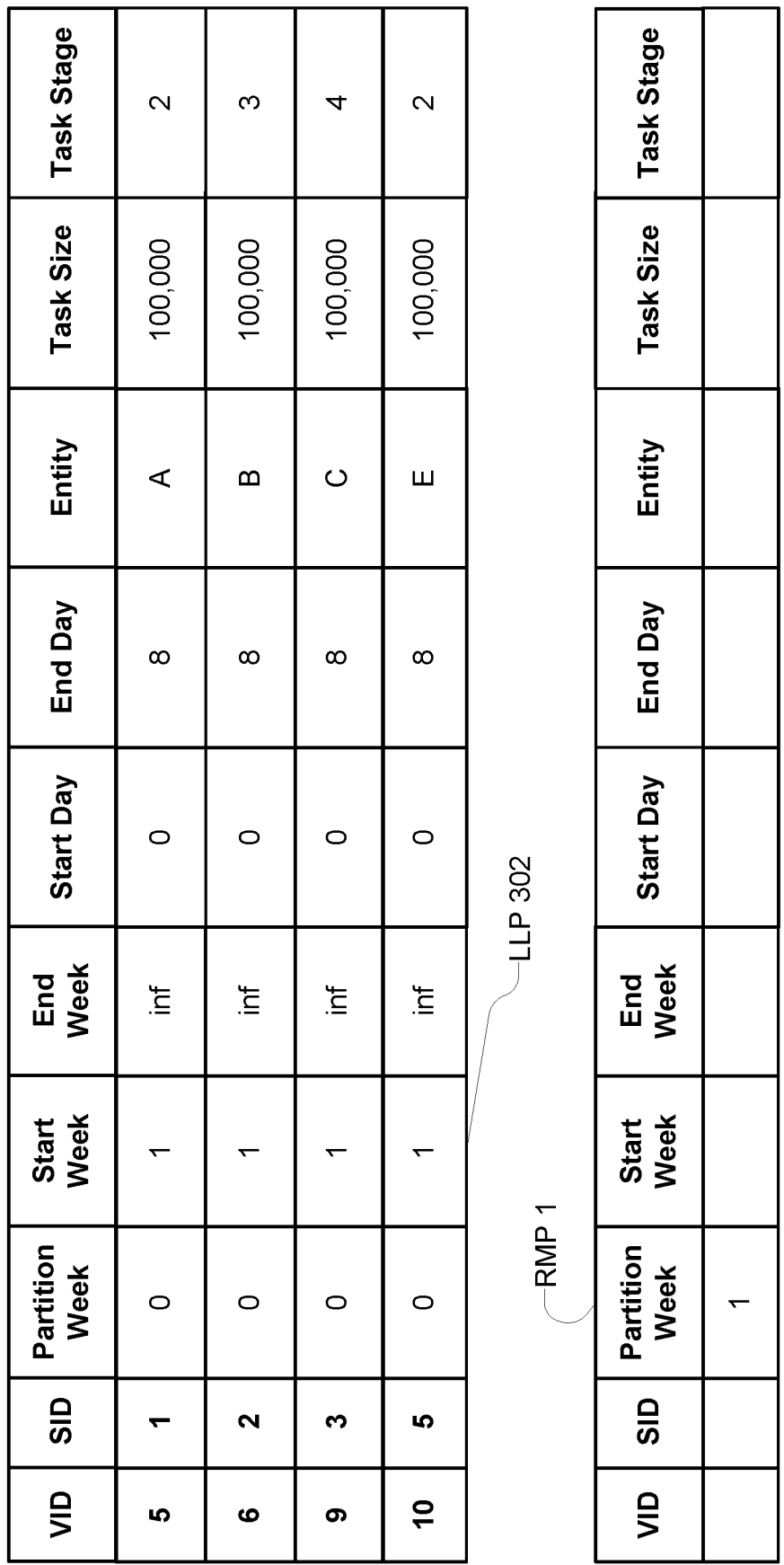
FIG. 6 is a block diagram illustrating a long-lived partition and a recently modified partition at the start of a new year according to one embodiment.

FIG. 6 illustrates a snapshot for a start of a new year. Once a previous year completes and a new year is started, a LLP 302 for a new year will be seeded by copying over the live (end week is inf) records from a previous year's LLP 301 and live (end_day is inf) records from a last RMP of the previous year. Note that LLP 302 can have a same database scheme as LLP 301. The copied over records are assigned a start_week of 1 in LLP 302 since LLP 302 represents the first week of the year.

Figure 7:
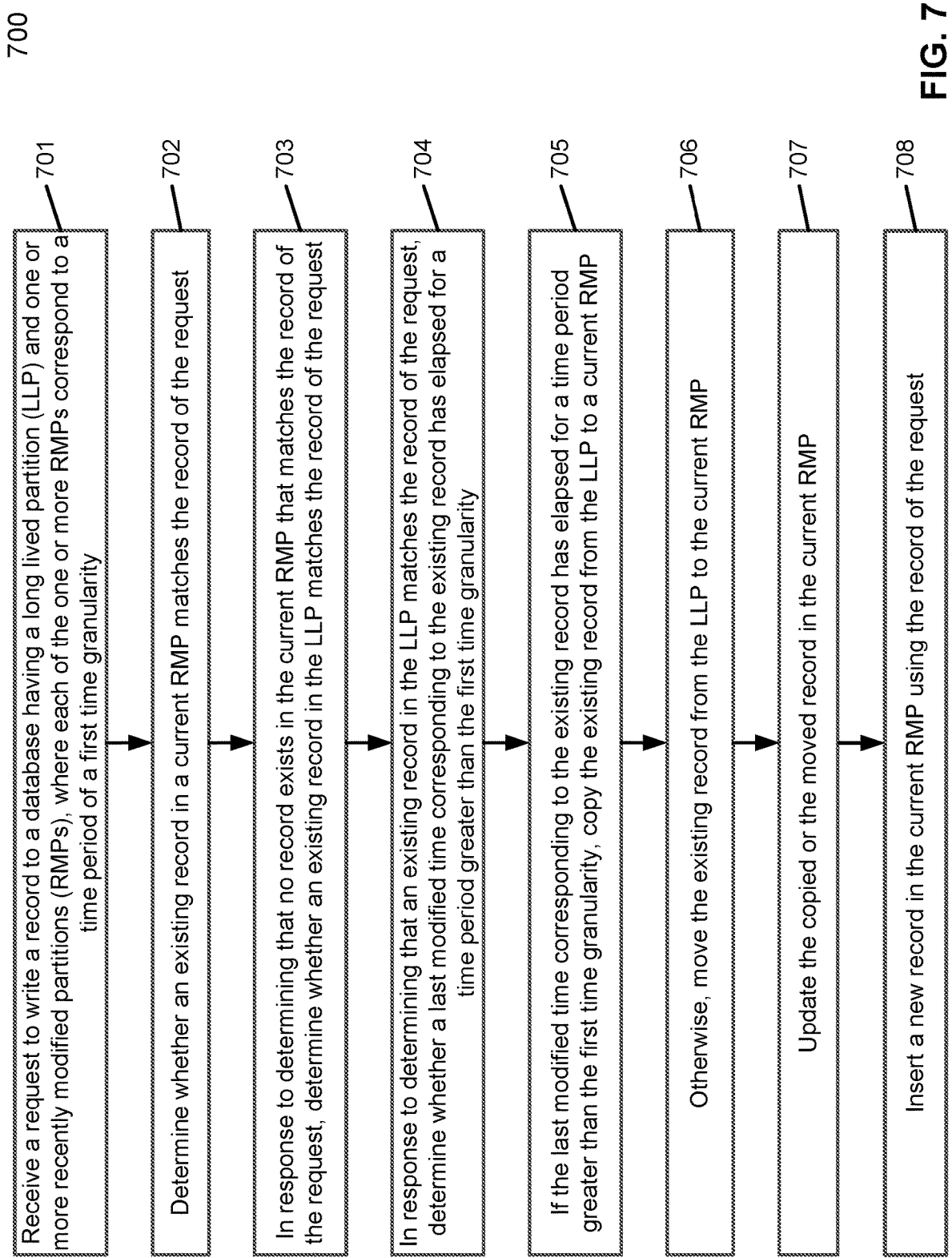
FIG. 7 is a flow diagram illustrating a process to write entries to an LLRM system according to one embodiment.

FIG. 7 is a flow diagram illustrating a process to write entries to an LLRM system where the LLP has an existing match for a write request according to one embodiment.

Process 700 may be performed by processing logic which may include software, hardware, or a combination thereof. For example, process 700 may be performed by database engine 120 of FIG. 2.

At block 701, processing logic receives a request to write a record to a database having a long lived partition (LLP) and one or more recently modified partitions (RMPs), where each of the one or more RMPs corresponds to a time period of a first time granularity (e.g., a week). The write request can be processed from a data source (such as data sources 105 of FIGS. 1A-1B), or manually inserted by a user.

At block 702, processing logic determines whether an existing record in a current RMP matches the record of the request. At block 703, in response to determining that no record exists in the current RMP that matches the record of the request, processing logic determines whether an existing record in the LLP matches the record of the request.

At block 704, in response to determining that an existing record in the LLP matches the record of the request, processing logic determines whether a last modified time corresponding to the existing record has elapsed for a time period greater than the first time granularity (a week). The last modified time can correspond to the start_week, end_week, attributes in the LLP as shown in FIGS. 3-6. start_week and end_week attributes indicate, with a granularity of a week, when a record is inserted into a LLP. In one embodiment, last modified time corresponding to an existing record has elapsed for a time period greater than the first time granularity (a week) if (week of a system time)> start_week.

For example, if a system time for a current week is 4 and an existing matching record in LLP has a start_week of 4, the record is indicative of a last modified time that has not elapsed for a time period greater than a granularity of a week. For another example, if a system time for a current week is 4 and an existing matching record in LLP has a start_week of 3 or less, the record is indicative of a last modified time that has elapsed for a time period greater than a granularity of a week. In one embodiment, the end_week of a live time-series record has a value of 'inf'.

At block 705, if the last modified time corresponding to the existing record has elapsed for a time period greater than the first time granularity, processing logic copies the existing record from the LLP to a current RMP. E.g., record of row 305 copied to row 312, as shown with respect to entity A in FIG. 4A.

At block 706, otherwise, processing logic moves the existing record from the LLP to the current RMP. E.g., record of row 307 is copied to row 314 and then record of row 307 is deleted, as shown with respect to entity B in FIG. 4A. In another example, record of row 317 is copied to row 321 and then record of row 317 is deleted, as shown with respect to entity C in FIG. 5B. In another example, record of row 319 is copied to rows 325 and then record of row 319 is deleted, as shown with respect to entity E in FIG. 5B.

At block 707, processing logic updates the copied (312) or the moved (314, 321, or 325) record in the current RMP. For example, as shown in FIG. 4A, (start day, end day) of records 312, 314 are updated to (day 1, day 3) (start day of RMP, day of system time) for entities A-B. As shown in FIG. 5B, (start day, end day) of records 321, 325 are updated to (day 1, day 4) (start day of RMP, day of system time) for entities C and E.

At block 708, processing logic inserts a new record in the current RMP using the record of the request. For example, rows 313 is inserted as shown with respect to entity A in FIG. 4A. For another example, row 323 is inserted with respect to entity C in FIG. 5B. For another example, row 327 is inserted with respect to entity E in FIG. 5B.

In one embodiment, determining if an existing record in the LLP matches the record of the request includes determining if one or more data fields in the LLP match a field or attribute of the record of the request. In one embodiment, copying the existing record from the LLP to a current RMP includes retaining a version identifier (VID) of the record, updating a partition start time to a relative start time of the current RMP, and updating a partition end time field associated with the existing record in the LLP to a current system time.

In one embodiment, processing logic further determines that no existing record in either the LLP or the RMP matches the record of the request, and insert a new record using the record of the request into the current RMP. In one embodiment, in response to determining a current system time is at an end of the first time granularity corresponding to the current RMP, processing logic creates a new RMP as the current RMP, and processing logic copies live data from a previous RMP to the LLP.

In one embodiment, in response to determining a current system time is at an end of a second granularity corresponding to the LLP, processing logic copies live records from the LLP and the current RMP to a new LLP that is indicative of a time period of the second granularity. In one embodiment, the long lived partition (LLP) and the one or more recently modified partitions (RMPs) include time-series data. In one embodiment, the long lived partition (LLP) and the one or more recently modified partitions (RMPs) shares a same database schema.

In one embodiment, the long lived partition (LLP) and the one or more recently modified partitions (RMPs) includes at least one of fields: start time of LLP, end time of LLP, start time of RMP, or end time of RMP. In one embodiment, a field type is a smallint with a size of 2 bytes for at least one of fields: start time of LLP, end time of LLP, start time of RMP, or end time of RMP.

Figure 8:
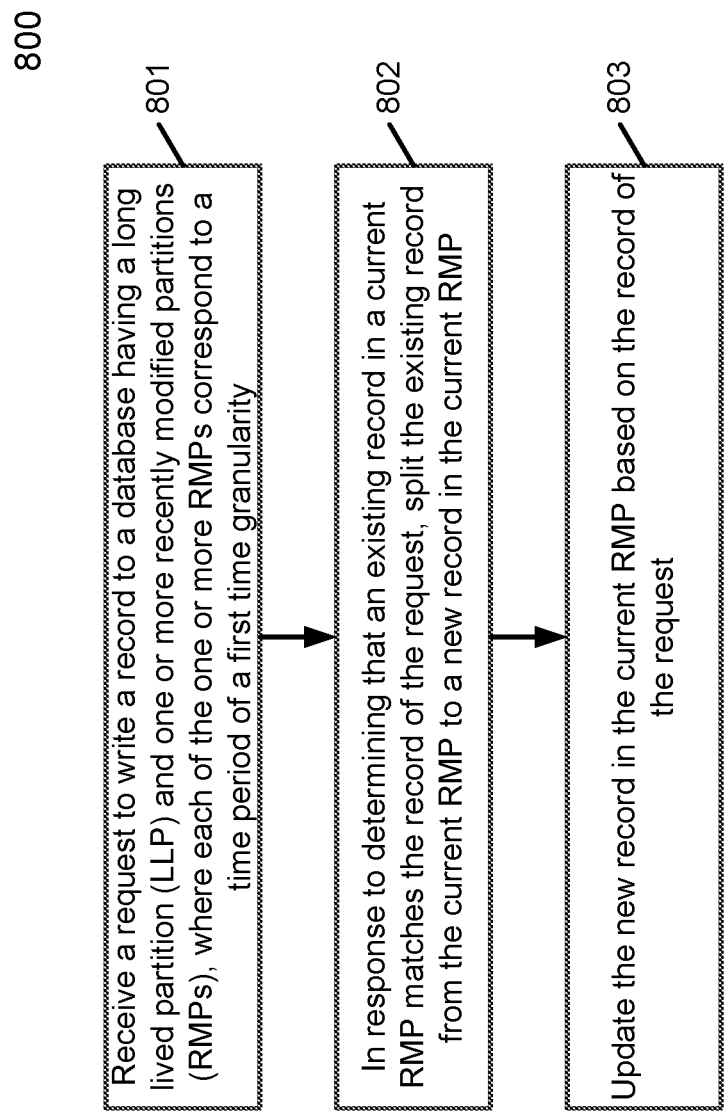
FIG. 8 is a flow diagram illustrating a process to write entries to an LLRM system where a current recently modified partition (RMP) has an existing match for a write request according to one embodiment.

FIG. 8 is a flow diagram illustrating a process to write entries to an LLRM system where a current RMP has an existing match for a write request according to one embodiment. Process 800 may be performed by processing logic which may include software, hardware, or a combination thereof. For example, process 800 may be performed by database engine 120 of FIG. 2.

At block 801, processing logic receives a request to write a record to a database having a long lived partition (LLP) and one or more recently modified partitions (RMPs), where each of the one or more RMPs corresponds to a time period of a first time granularity (e.g., a week). The write request can be processed from a data source, or manually inserted by a user.

At block 802, in response to determining that an existing record in a current RMP matches the record of the request, processing logic splits the existing record from the current RMP to a new record in the current RMP. E.g., a new record is inserted using a combination of information from the existing record and the request. An illustration is shown with respect to entity C in row 309 of FIG. 4A. Here, an update is made to entity C, and since row 309 existing, row 309 is split to row 317.

At block 803, processing logic updates the new record in the current RMP based on the record of the request. Row 317 is updated accordingly, e.g., task stage is updated to 3, as shown in FIG. 4A.

Figure 9:
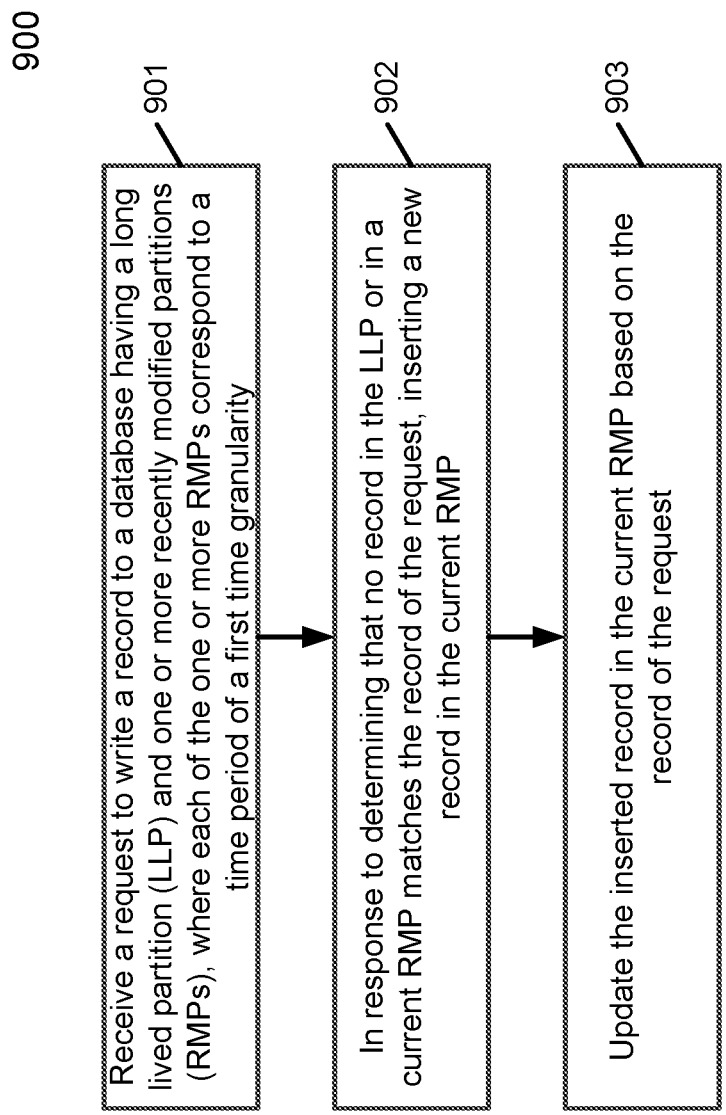
FIG. 9 is a flow diagram illustrating a process to write entries to an LLRM system where none of the LLP/RMP has an existing match for a write request according to one embodiment.

FIG. 9 is a flow diagram illustrating a process to write entries to an LLRM system where none of the LLP/RMP has an existing match for a write request according to one embodiment. Process 900 may be performed by processing logic which may include software, hardware, or a combination thereof. For example, process 900 may be performed by database engine 120 of FIG. 2.

At block 901, processing logic receives a request to write a record (e.g., time series data) to a database having a long lived partition (LLP) and one or more recently modified partitions (RMPs), where each of the one or more RMPs corresponds to a time period of a first time granularity (e.g., a week). The write request can be processed from a data source, or manually inserted by a user. Time series data, also referred to as time-stamped data, is a sequence of data points indexed in time order. Time-stamped is data collected at different points in time. These data points typically consist of successive measurements made from the same source over a time interval and are used to track change over time.

At block 902, in response to determining that no record in the LLP or in the RMPs matches the record of the request, processing logic inserts a new record to the current RMP. An illustration is shown with respect to entity E in row 319 of FIG. 4A. Here, entity E is not associated with any existing records. Thus, record 319 is inserted into RMP 4, as shown in FIG. 4A.

At block 903, processing logic updates the new record in the current RMP based on the record of the request. Here, record 319 is inserted accordingly, e.g., task stage is set to 1, as shown in FIG. 4A.

Figure 10:
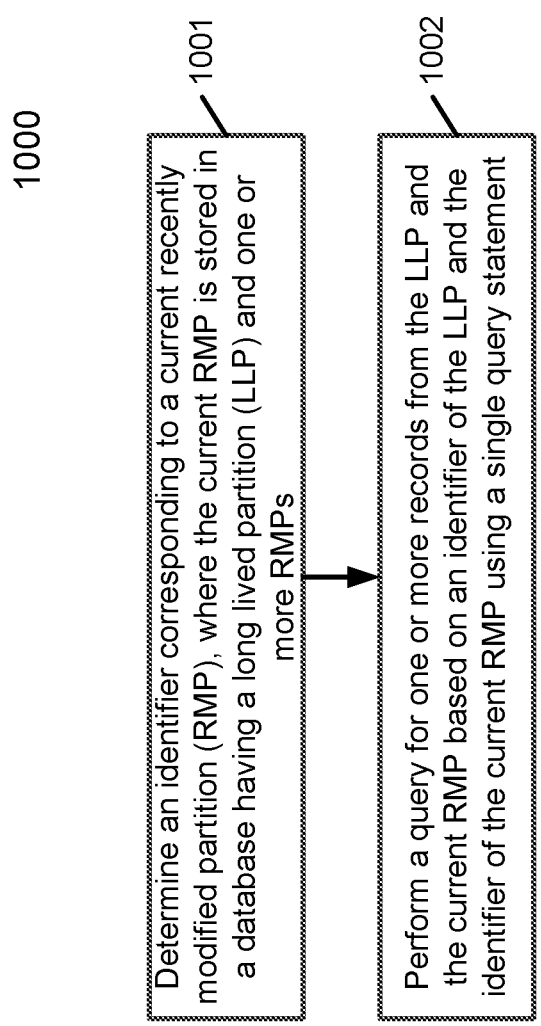
FIG. 10 is a flow diagram illustrating a process to query records from an LLRM system according to one embodiment.

FIG. 10 is a flow diagram illustrating a process to query records from an LLRM system according to one embodiment. Process 1000 may be performed by processing logic which may include software, hardware, or a combination thereof. For example, process 1000 may be performed by database engine 120 of FIG. 2.

At block 1001, processing logic determines an identifier corresponding to a current recently modified partition (RMP), wherein the current RMP is stored in a database having a long lived partition (LLP) and one or more RMPs.

At block 1002, processing logic performs a query for one or more records from the LLP and the current RMP based on an identifier of the LLP and the identifier of the RMP using a single query statement. In one embodiment, the identifier is the partition_week attribute in the database. Note that LLP can have a value of 0 for attribute partition_week, while RMPs has a value of a corresponding week (e.g., 1-52) for attribute partition_week.

In one embodiment, the query includes a time snapshot query for a first time point, or a trend query to query records between the first time point and a second time point, or a pulse query to query records between the first time point and one or more third time points. A pulse query compares records between one fixed timepoint and multiple varying time points. For example, for time points (t0, t1, t2, t3, t4, and t5), time point t0 can be fixed so records can be compared between t0 and t1, t0 and t2, to and t3, and so forth. In one embodiment, performing the query includes loading the LLP partition and the current RMP partition from a storage to a cache memory.

Note that some or all of the components as shown and described above (e.g., database engine 120 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In one embodiment, an entity can be a user group, an organization or company, or a unit or department of an organization or company. A task database system can be a customer relationship management (CRM) system. A task refers to an action performed by an entity. A task represents an opportunity, a project, or a business process. For example, a task can be a process of negotiating an agreement between two entities such as an agreement for one entity (referred to as a target entity) to acquire services or goods from another entity (referred to as a source entity). A task can be performed in a number of task stages representing a progress of the task. For example, task stages can include "closed," "committed," "best case," "pipeline,"

Figure 11:
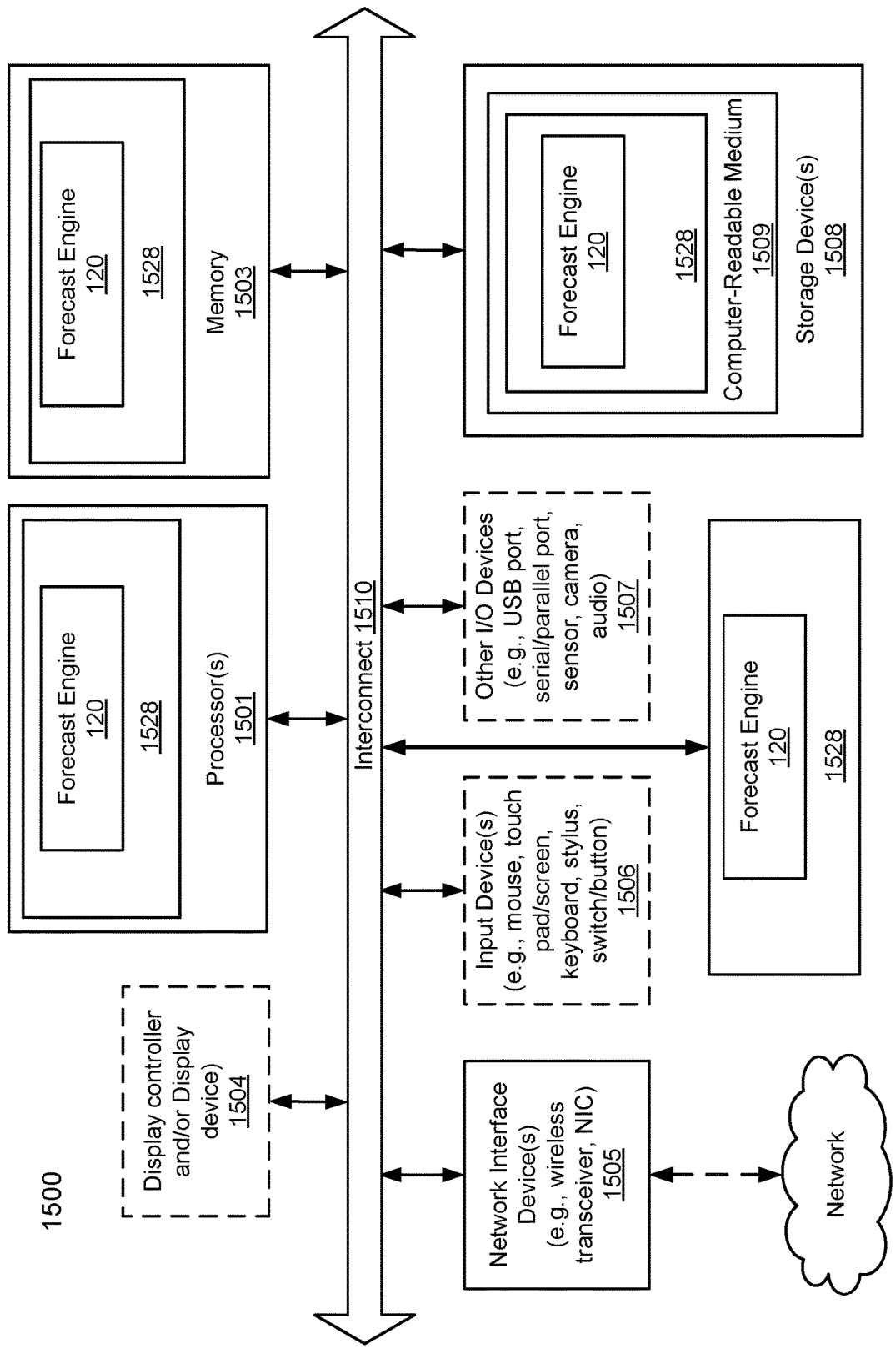
FIG. 11 is a block diagram illustrating a data processing system according to one embodiment.

FIG. 11 is a block diagram illustrating an example of a data processing system which may be used with one embodiment of the invention. For example, system 1500 may represent any of data processing systems described above performing any of the processes or methods described above, such as, for example, client devices 101-102 and server 104 of FIGS. 1A-B. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to write a record to a database with time series data, the method comprising:

receiving, by a server having one or more processors and memory, a request to write the record to the database having a long lived partition (LLP) and one or more recently modified partitions (RMPs), wherein each of the one or more RMPs corresponds to a time period of a first time granularity;

determining, by the one or more processors, whether an existing record in a current RMP matches the record of the request;

in response to determining that no record exists in the current RMP that matches the record of the request, determining, by the one or more processors, whether an existing record in the LLP matches the record of the request;

in response to determining that an existing record in the LLP matches the record of the request, determining, by the one or more processors, whether a last modified time corresponding to the existing record has elapsed for a time period greater than the first time granularity;

in response to determining that the last modified time corresponding to the existing record has elapsed for a time period greater than the first time granularity, copying, by the one or more processors, the existing record from the LLP to the current RMP;

in response to determining that the last modified time corresponding to the existing record has not elapsed for a time period greater than the first time granularity, moving, by the one or more processors, the existing record from the LLP to the current RMP;

in response to determining that no record exists in either the LLP or the RMP that matches the record of the request, inserting, by the one or more processors, a new record in the current RMP based on the record of the request;

storing, by the one or more processors, the current RMP in the database having the LLP and the one or more RMPs;

receiving a query request from a client, wherein the query request corresponds to an initial snapshot requested by an analytic system of the client and the query request comprises a single time point query statement having time information;

identifying the current RMP based on the time information;

loading the LLP and the identified RMP in a cache memory; and querying the LLP and the identified RMP in the cache memory based on the query request to retrieve the time series data.

2. The method of claim 1, wherein determining whether an existing record in the LLP matches the record of the request comprises determining whether one or more data fields in the LLP match a field of the record of the request.

3. The method of claim 1, wherein copying the existing record from the LLP to the current RMP comprises retaining a version identifier (VID) of the record, updating a partition field associated with the existing record in the LLP to a value corresponding to a partition of the current RMP and updating an end time of LLP field associated with the existing record in the LLP to a current system time.

4. The method of claim 1, further comprising:
in response to determining a current system time is at an end of the first time granularity corresponding to the current RMP, creating a new RMP as the current RMP; and
copying live data from a previous RMP to the LLP.

5. The method of claim 1, further comprising: in response to determining a current system time is at an end of a second granularity corresponding to the LLP, copying live records from the LLP and the current RMP to a new LLP that is indicative of a time period of the second granularity.

6. The method of claim 1, wherein the LLP and the one or more RMPs share a same schema.

7. The method of claim 1, wherein the LLP and the one or more RMPs includes at least one of fields: partition, start time of LLP, end time of LLP, start time of RMP, or end time of RMP.

8. The method of claim 1, wherein a field type is a smallint with a size of 2 bytes for at least one of fields: start time of LLP, end time of LLP, start time of RMP, or end time of RMP.

9. A non-transitory machine-readable medium having instructions stored therein, which when executed by one or more processors, causing the one or more processors to perform operations, the operations comprising:
receiving a request to write a record to a database having a long lived partition (LLP) and one or more recently modified partitions (RMPs), wherein each of the one or more RMPs corresponds to a time period of a first time granularity;
determining whether an existing record in a current RMP matches the record of the request;
in response to determining that no record exists in the current RMP that matches the record of the request, determining whether an existing record in the LLP matches the record of the request;
in response to determining that an existing record in the LLP matches the record of the request, determining whether a last modified time corresponding to the existing record has elapsed for a time period greater than the first time granularity;
in response to determining that the last modified time corresponding to the existing record has elapsed for a time period greater than the first time granularity, copying the existing record from the LLP to the current RMP;
in response to determining that the last modified time corresponding to the existing record has not elapsed for a time period greater than the first time granularity, moving the existing record from the LLP to the current RMP;
in response to determining that no record exists in either the LLP or the RMP that matches the record of the request, inserting a new record in the current RMP based on the record of the request;
storing the current RMP in the database having the LLP and the one or more RMPs;
receiving a query request from a client, wherein the query request corresponds to an initial snapshot requested by an analytic system of the client and the query request comprises a single time point query statement having time information;
identifying the current RMP based on the time information;
loading the LLP and the identified RMP in a cache memory; and
querying the LLP and the identified RMP in the cache memory based on the query request to retrieve time series data.

10. The non-transitory machine-readable medium of claim 9, wherein determining whether an existing record in the LLP matches the record of the request comprises determining whether one or more data fields in the LLP match a field of the record of the request.

11. The non-transitory machine-readable medium of claim 9, wherein copying the existing record from the LLP to the current RMP comprises retaining a version identifier (VID) of the record, updating a partition field associated with the existing record in the LLP to a value corresponding to a partition of the current RMP and updating an end time of LLP field associated with the existing record in the LLP to a current system time.

12. The non-transitory machine-readable medium of claim 9,
wherein the operations further comprise:
in response to determining a current system time is at an end of the first time granularity corresponding to the current RMP, creating a new RMP as the current RMP; and
copying live data from a previous RMP to the LLP.

13. The non-transitory machine-readable medium of claim 9, wherein the operations further comprise in response to determining a current system time is at an end of a second granularity corresponding to the LLP, copying live records from the LLP and the current RMP to a new LLP that is indicative of a time period of the second granularity.

14. The non-transitory machine-readable medium of claim 9, wherein the LLP and the one or more RMPs share a same schema.

15. The non-transitory machine-readable medium of claim 9, wherein the LLP and the one or more RMPs includes at least one of fields: partition start time of LLP, end time of LLP, start time of RMP, or end time of RMP.

16. The non-transitory machine-readable medium of claim 9, wherein a field type is a smallint with a size of 2 bytes for at least one of fields: start time of LLP, end time of LLP, start time of RMP, or end time of RMP.

17. A system comprising:
one or more processors; and
a non-transitory machine-readable medium comprising executable instructions, which when executed by the one or more processors, causes the one or more processors to perform operations, the operations comprising
receiving a request to write a record to a database having a long lived partition (LLP) and one or more recently modified partitions (RMPs), wherein each of the one or more RMPs corresponds to a time period of a first time granularity;
determining whether an existing record in a current RMP matches the record of the request;
in response to determining that no record exists in the current RMP that matches the record of the request, determining whether an existing record in the LLP matches the record of the request;
in response to determining that an existing record in the LLP matches the record of the request, determining whether a last modified time corresponding to the existing record has elapsed for a time period greater than the first time granularity;
in response to determining that the last modified time corresponding to the existing record has elapsed for a time period greater than the first time granularity, copying the existing record from the LLP to the current RMP;

in response to determining that the last modified time corresponding to the existing record has not elapsed for a time period greater than the first time granularity, moving the existing record from the LLP to the current RMP;

in response to determining that no record exists in either the LLP or the RMP that matches the record of the request, inserting a new record in the current RMP based on the record of the request;

storing the current RMP in the database having the LLP and the one or more RMPs;

receiving a query request from a client, wherein the query request corresponds to an initial snapshot requested by an analytic system of the client and the query request comprises a single time point query statement having time information;

identifying the current RMP based on the time information;

loading the LLP and the identified RMP in a cache memory; and querying the LLP and the identified RMP in the cache memory based on the query request to retrieve time series data.

18. The system of claim 17, wherein determining whether an existing record in the LLP matches the record of the request comprises determining whether one or more data fields in the LLP match a field of the record of the request.

* * * * *